United States Patent
Salice

(10) Patent No.: US 6,223,394 B1
(45) Date of Patent: May 1, 2001

(54) FITTING COMPONENT

(75) Inventor: Luciano Salice, Carimate (IT)

(73) Assignee: Arture Salice S.p.A., Novedrate/Como (IT)

(*) Notice: Subject to any disclaimer, the term of this patent is extended or adjusted under 35 U.S.C. 154(b) by 0 days.

(21) Appl. No.: 09/368,494

(22) Filed: Aug. 5, 1999

(30) Foreign Application Priority Data

Aug. 5, 1998 (DE) .......................................... 298 14 045 U
Oct. 19, 1998 (DE) .......................................... 298 18 605 U

(51) Int. Cl.⁷ ................................. E05D 5/00; E05D 5/16
(52) U.S. Cl. ............................................. 16/382; 411/386
(58) Field of Search ............................. 16/382, 383, 384, 16/387; 411/386

(56) References Cited

U.S. PATENT DOCUMENTS

| | | | |
|---|---|---|---|
| 3,156,152 | * 11/1964 | Reed | ..................... 411/386 |
| 4,091,499 | 5/1978 | Lautenschläger . | |
| 4,167,802 | 9/1979 | Röck et al. . | |
| 4,642,846 | * 2/1987 | Lautenschlager | ..................... 16/382 |
| 4,768,259 | * 9/1988 | Rock et al. | ..................... 16/382 |
| 4,973,209 | * 11/1990 | Essom et al. | ..................... 411/386 |
| 4,982,476 | 1/1991 | Salice . | |
| 5,345,654 | 9/1994 | Ferrari et al. | ..................... 16/251 |
| 5,536,127 | 7/1996 | Pennig | ..................... 411/413 |
| 5,569,009 | 10/1996 | Suzuki | ..................... 411/413 |
| 5,836,731 | * 11/1998 | Goodwin et al. | ..................... 411/386 |

FOREIGN PATENT DOCUMENTS

| | | |
|---|---|---|
| 444 704 | 2/1968 | (CH) . |
| 92 12 492 | 3/1994 | (DE) . |
| 295 06 600 U | 10/1995 | (DE) . |
| 196 15 191 | 10/1997 | (DE) . |
| 0 088 428 | 9/1983 | (EP) . |
| 0 705 987 | 4/1996 | (EP) . |
| 403272309A | * 12/1991 | (JP) ..................... 411/386 |

* cited by examiner

*Primary Examiner*—Chuck Y. Mah
(74) *Attorney, Agent, or Firm*—Jacobson, Price, Holman & Stern, PLLC

(57) ABSTRACT

A fitting component for furniture or other elements, having fixing holes to receive fixing screws which are insertable in pre-drilled holes in the furniture element. Each of the fixing screws has a head and a shaft, the head having corrugations or knurls on the underside thereof. The shaft has a threaded section adjacent the head and a thread-free section at the end of the shaft. The thread-free section has a diameter corresponding to a diameter of the pre-drilled holes for pre-fixing of the fixing screws.

16 Claims, 3 Drawing Sheets

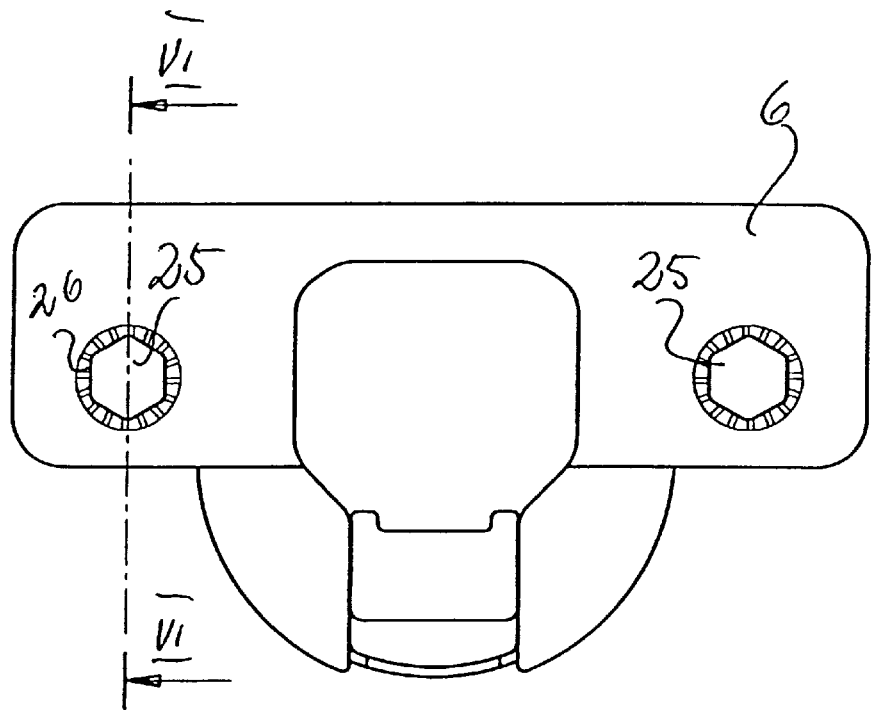
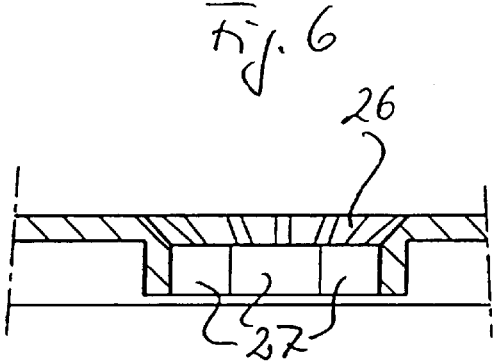
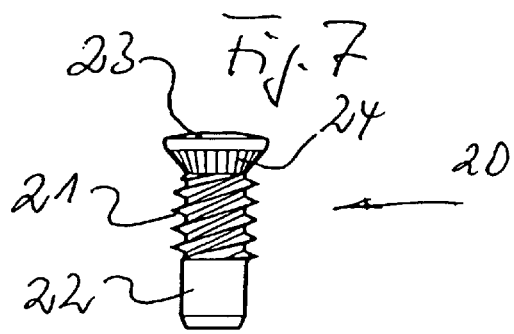

FITTING COMPONENT

BACKGROUND OF THE INVENTION

1. Field of the Invention

The invention concerns a fitting component, preferably for furniture, such as hinge bowl element, with fixing screws passing through holes in said fitting component, said screws being insertable in pre-drilled holes of a carcass element or a furniture door.

2. Description of the Related Art

If, for example, hinge bowl elements of hinges, which form their moving parts, need to be connected to a door, it is necessary, following insertion of the hinge bowl element in the matching shallow blind hole, to align the holes of the fixing flange of said hinge bowl element to the pre-drilled holes of the door before the fixing screws can be wound in and tightened. This alignment of the holes of the fixing flange to the pre-drilled holes of the door and the subsequent insertion, winding-in and tightening of the fixing screws demands additional time which extends the production times to an undesirable degree.

SUMMARY OF THE INVENTION

The purpose of the invention is therefore to create a fitting component of the type mentioned at the beginning which facilitates pre-assembly in the correct position in a simple and quick fashion so that the assembly times can be shortened to the times required merely for tightening the fixing screws.

This objective is achieved according to the invention in that the fixing screws are provided with thread-free sections at the ends of their shafts, the diameter of which corresponds to the diameter of the pre-drilled holes, and that said fixing screws are also each provided with a threaded section which forms a friction-lock connection with a fixing hole, preferably with a beaded fixing hole of the fitting component, allowing the thread-free sections to pass through the holes of the fitting component.

The fitting component according to the invention can thus be easily and quickly installed owing to the fact that the fixing screws mounted with their threaded sections in the holes of said fitting component exhibit thread-free sections which pass through said fitting component and which can be inserted for their pre-assembly in the pre-drilled holes of a furniture element in such a way that said fitting component is, as a result, pre-assembled in its correct position. The threaded sections of the fixing screws are held in the holes of the fitting component by forming a frictional lock with the hole walls, or even cutting into them. If the fitting component is mounted for the purpose of pre-assembly with the thread-free sections of the fixing screws inserted in the pre-drilled holes of a furniture element, final assembly is performed by simply winding in the fixing screws in the pre-drilled holes so that the threaded sections which were previously located in the holes of the fitting component are screwed into the pre-drilled holes.

In accordance with a preferred embodiment, it is envisaged that the thread-free sections have a length of approx. ⅔ to ⅓ of the length of the screw shaft. A sufficient length of the thread-free sections enables the fitting component to be fixed in relation to the carcass component in its pre-assembled condition such that, for example, a door hinge-mounted on the fitting component can be repositioned. The thread-free sections also enable the threaded section to be reduced to a minimum length which just ensures application of the necessary axial fixing force for securing the fitting component. Here use is made of the fact that the main load acting on the fitting component runs transverse to the holes of the fitting component so that this load can be absorbed in the first instance by the thread-free sections inserted in the holes. The threaded sections themselves can thus be reduced to a short length which is just long enough in order to absorb the load which occurs in the longitudinal direction of the holes. As a result, the assembly times of the fitting component according to the invention can be reduced to a minimum, and indeed to values which are comparable to the assembly times of a so-called snaplock device such as that disclosed in patent specification DE-U1-295 06 600.

As a further useful feature, the fixing screws may exhibit between their heads and their threaded sections thread-free sections, the length of which corresponds to the length of the holes of the fitting components. With this further development of the invention, it is ensured that, in the assembled condition, the threaded sections of the fixing screws completely exit the holes of the fitting component and are wound into the fixing holes. The diameter of this thread-free section of the fixing screw usefully corresponds to the diameter of the holes of the fitting component.

In order to enable the fixing screws to be wound in and tightened with just a few turns, the threaded sections of the fixing screws may comprise double-start threads.

Usefully, the fixing screws may take the form of so-called Euro screws.

In a further development of the invention, it is envisaged that the holes of the fitting component take the form of holes with beaded rims. This design is usefully selected if the fitting components consist of punched sheet metal fabrications.

Electric screwdrivers are frequently employed for winding in the fixing screws of fitting components of the type mentioned at the beginning. Such screwdrivers may be calibrated or adjusted to a specific winding-in torque which is aligned to the fixing screws commonly employed. Because, however, the screws according to the invention only exhibit a short shaft section containing a thread, these may be overwound in the pre-drilled holes when performing assembly work with electric screwdrivers.

In order to prevent the fixing screws from being overwound when assembling the fitting components with electric screwdrivers, it is envisaged in accordance with another embodiment of the invention that the fixing screws be provided at the bottom of their heads with corrugations or knurls. The corrugations or knurls which may consist of flutes running radially relative to the screw axis, increase the winding-in torque just before completion of the winding-in operation of the fixing screws due to increased friction with the hole rims, so that even when performing assembly work with electric screwdrivers, a resistance value corresponding to the torque setting is achieved, so preventing the overwinding of the fixing screws.

Preferably, the fixing screws take the form of countersunk head screws which are provided on their truncated-cone-shaped underside with corrugations or knurls.

In order to further increase the winding-in torque resistance during the end phase of the fixing screw winding-in operation, the rims of the holes of the fitting component may also be provided with corrugations or knurls.

When employing countersunk head screws, the rims of the holes may usefully be designed to match the truncated-cone-shaped underside of said countersunk head screws and be provided with corrugations or knurls.

In a further embodiment of the invention, it is envisaged that the holes of the fitting components be of polygonal, preferably hexagonal, design. In this embodiment, the self-tapping fixing screws are held and centred in the holes of the fitting components by virtue of the fact that they only cut into the sides of the holes in an approximately punctiform manner.

BRIEF DESCRIPTION OF THE DRAWINGS

Embodiments of the invention are explained in the following on the basis of the drawing, wherein

FIG. 5 shows a plan view of a second embodiment of a hinge bowl element with fixing flange of a furniture hinge;

FIG. 6 shows a section through the fixing flange of the furniture hinge following Line VI—VI in FIG. 5; and FIG. 7 shows a side view of the fixing screw for the hinge bowl element with fixing flange in accordance with FIGS. 5 and 6.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
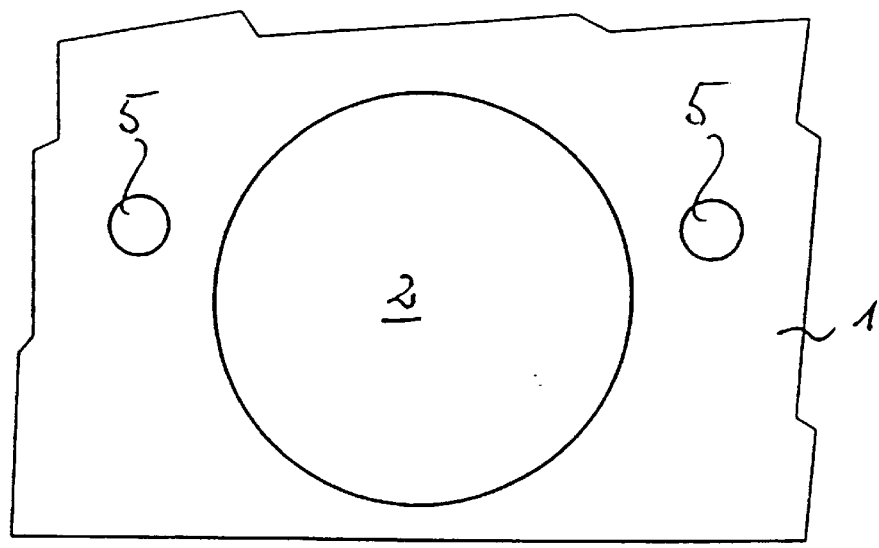
FIG. 1 shows a plan view of a pre-drilled area of a furniture door which serves for the fitting of the hinge bowl element with fixing flange of a furniture hinge shown in FIG. 2.
Figure 2:
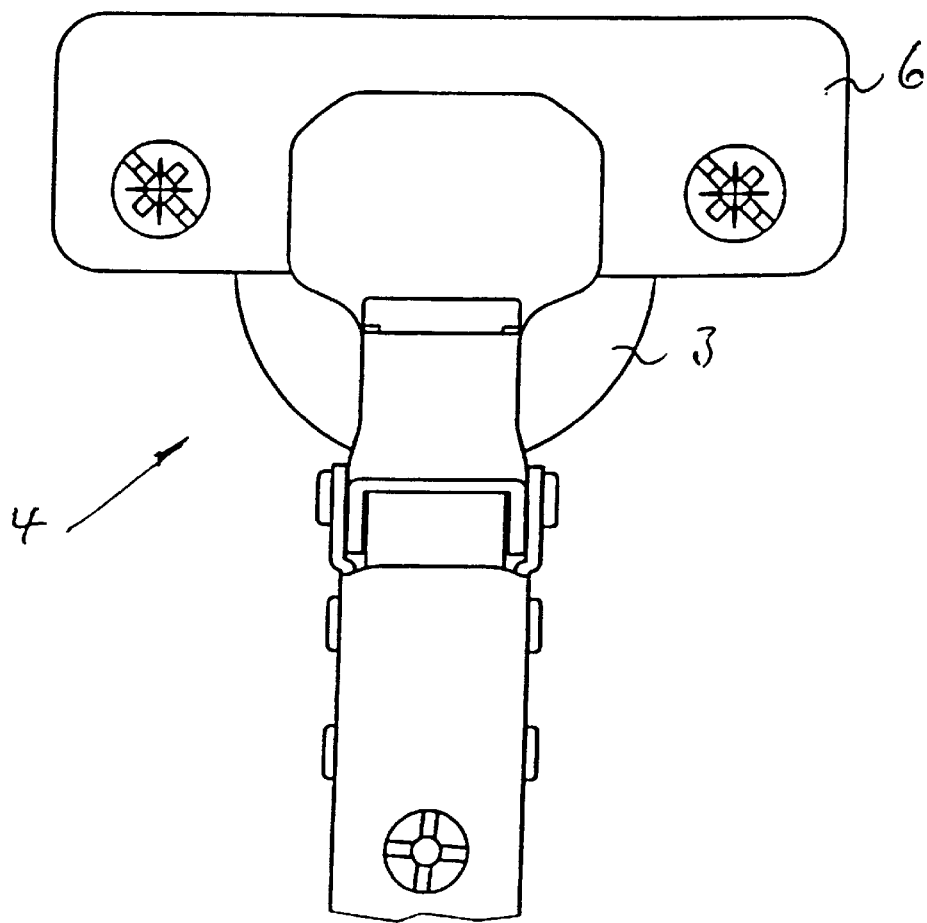
FIG. 2 shows said hinge bowl element with fixing flange of a furniture hinge.

FIG. 1 shows a plan view of an edge section of a furniture door 1 which is provided with a shallow blind hole 2 for the hinge bowl element 3 of a double-link hinge 4 illustrated in FIG. 2. Also drilled into the door next to the hole 2 are two further blind holes 5 for the fixing screws.

Figure 3:
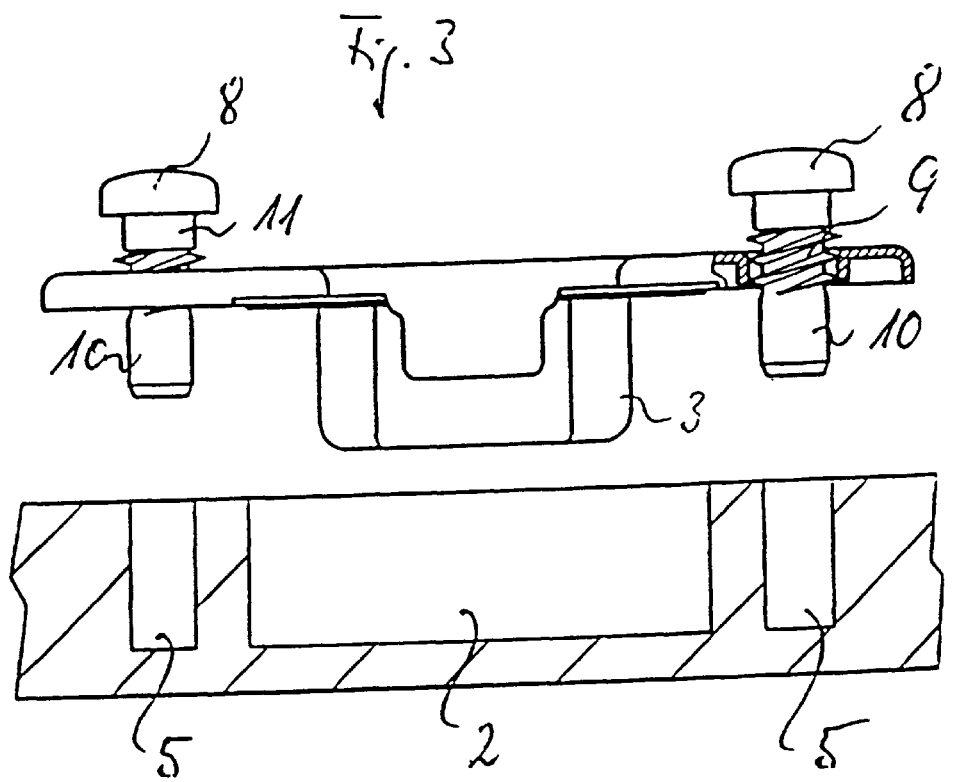
FIG. 3 shows a side view of a hinge bowl element of a furniture hinge according to FIG. 2, which is aligned for insertion in the pre-drilled holes of the door.

The bowl-shaped or trough-shaped portion 3 of the hinge 4 is provided with a fixing flange 6 in the normal manner, said flange taking the form of a sheet metal punching and being provided with two beaded fixing holes 7. Located in the beaded fixing holes 7 are the fixing screws 8 in the manner illustrated in FIG. 3. The fixing screws 8 feature a threaded section 9 with a self-tapping thread, a thread-free section 10 at the end, and between the head and threaded section 9 a further thread-free section 11, the length of which corresponds roughly to the length of the beaded fixing holes 7.

Figure 4:
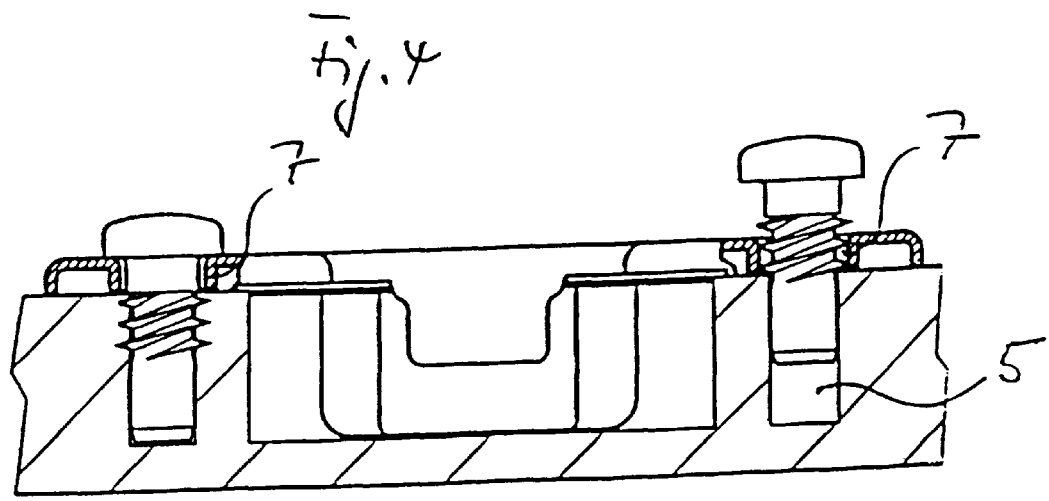
FIG. 4 shows the hinge bowl element secured in the pre-drilled holes of the door, with a completely wound-in fixing screw and a fixing screw of which only the thread-free end section of the shaft is inserted in a fixing hole.

The thread-free end sections 10 of the screw shafts feature a diameter which corresponds to the diameter of the fixing holes 5, so that for the purpose of pre-assembly the thread-free sections 10 can be inserted in the fixing holes 5 such that pre-assembly of the moving hinge portion is already effected. This method of pre-assembly is illustrated on the right-hand side of FIG. 4.

The fixing screws 8 are located by their threaded sections 9 in the beaded holes 7 such that they cannot be lost prior to the final assembly operation. Moreover, the threaded sections 9 of the fixing screws 8 form a sufficiently firm friction-lock connection with the holes 7 so that, after insertion of the thread-free sections 10 in the fixing holes 5, a relatively firm pre-assembled condition is already achieved. Following this pre-assembly operation, the fixing screws 8 merely need to be tightened down in the manner illustrated on the left-hand side of FIG. 4, so that final assembly is then also completed.

Illustrated in FIG. 5 is a second embodiment of a fitting component comprising a hinge bowl element with fixing flange which can be inserted in a shallow blind hole 2 in accordance with FIG. 1, and secured as illustrated in FIG. 7 by fixing screws which are inserted in the pre-drilled holes 5.

Fixing screw 20 exhibits a shaft of which the upper section 21 is provided with a self-tapping thread. The lower section 22 of the shaft is of cylindrical form and does not bear a thread. The thread-free section 22 thus corresponds to the thread-free section 10 of the first embodiment. Fixing screw 20 is designed as a countersunk head screw. The countersunk head 23 is provided at its truncated-cone-shaped underside 24 with a knurl or corrugation which, for example, may consist of a radiating pattern of adjacent flutes which run in the direction towards the axis of the fixing screw.

The fixing holes 25 of the fixing flange 6 are provided with recessed rims 26 to match the truncated-cone-shaped underside 24 of the heads 23 of the countersunk head screws 20. These rims 26 likewise exhibit a knurl or corrugation. The cross section of the fixing holes 25 is hexagonal so that the countersunk screws 20 can be wound into the fixing holes 25 for their pre-assembly such that they only cut into the sides 27 of the fixing holes 25 in an approximately punctiform manner.

In the case of the countersunk screws 20, the need for a thread-free section between the head and the threaded section 21 is eliminated as the countersunk head itself ensures good centering. The required pre-fixing of the countersunk head screws, and thus that of the fitting component, is achieved by the thread-free sections 22 which are pressed into the pre-drilled holes 5 for the purpose of pre-fixing them.

The invention being thus described, it will be obvious that the same may be varied in many ways. Such variations are not to be regarded as a departure from the spirit and scope of the invention, and all such modifications as would be recognized by one skilled in the art are intended to be included within the scope of the following claims.

What is claimed is:

1. A fitting component for a furniture element comprising fixing screws passing through fixing holes in said fitting component and insertable in pre-drilled holes of said furniture element, each of said fixing screws having a head and a shaft, said head having corrugations or knurls on an underside thereof, said shaft having a threaded section adjacent the head which forms a friction lock connection with a fixing hole, and a thread-free section adjacent an end of said shaft having a diameter corresponding to a diameter of said pre-drilled holes, said thread-free section passing through said fixing holes.

2. The fitting component according to claim 1, wherein the fixing screws are countersunk head screws having corrugations or knurls on a truncated-cone-shaped underside of their heads.

3. The fitting component according to claim 2, wherein rims of the fixing holes are designed to match the truncated-cone-shaped underside of the countersunk heads.

4. The fitting component according to claim 1, wherein rims of the fixing holes of the fitting component are provided with corrugations or knurls.

5. The fitting component according to claim 1, wherein the fixing holes of the fitting component are of polygonal design.

6. A fitting component comprising fixing holes to receive screws and fixing screws passing through said fixing holes in said fitting component and insertable in pre-drilled holes of an element to which said fitting component is to be mounted, each of said fixing screws having a head and a shaft, said head having corrugations or knurls on an underside thereof, said shaft having a threaded section adjacent the head and a thread-free section adjacent an end of said shaft, said thread-free section having a diameter corresponding to a diameter of at least one of said pre-drilled holes for pre-fixing of the fixing screws into the pre-drilled holes.

7. The fitting component according to claim 6, wherein the fixing screws are countersunk head screws with corrugations or knurls on a truncated-cone-shaped underside of their heads.

8. The fitting component according to claim 7, said corrugations or knurls of said truncated-cone-shaped underside having a radiating pattern of adjacent flutes running in a direction toward an axis of said fixing screw.

9. The fitting component according to claim 7, said fixing holes having recessed rims with corrugations or knurls similar to the corrugations or knurls of said truncated-cone-shaped underside of said countersunk head screws.

10. The fitting component according to claim 6, rims of the fixing holes of the fitting component being provided with corrugations or knurls.

11. The fitting component according to claim 6, wherein a cross section of said fixing holes is polygonal.

12. The fitting component according to claim 11, wherein a cross section of said fixing holes is hexagonal.

13. The fitting component according to claim 6, said thread-free sections having a length of approximately one-third to two-thirds of a length of the shaft.

14. The fitting component according to claim 6, wherein said element to which said fitting component is to be mounted is a piece of furniture.

15. The fitting component according to claim 14, wherein the fitting component is a hinge bowl element.

16. The fitting component according to claim 6, said fixing holes having recessed rims.

* * * * *